Feb. 6, 1962  M. M. SAUERS ETAL  3,019,568
LAWN MOWER GRINDER AND SHARPENER
Filed May 19, 1960
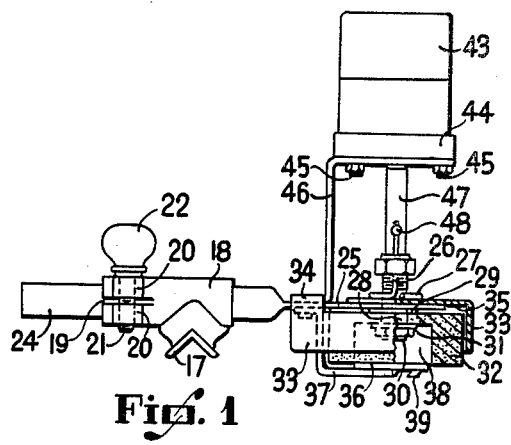
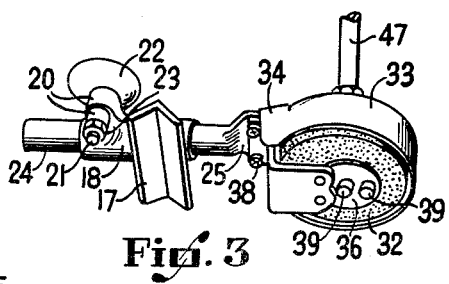
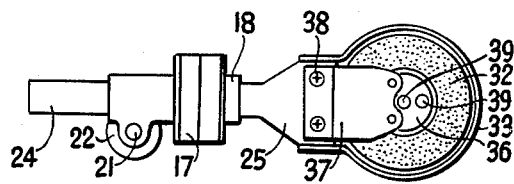
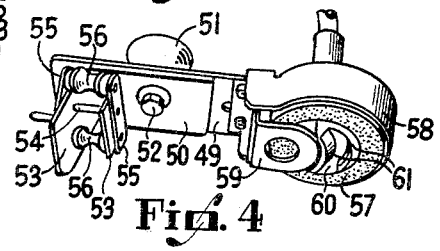
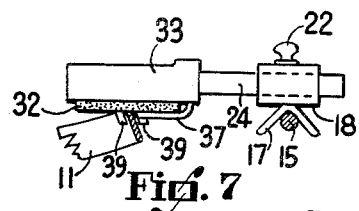
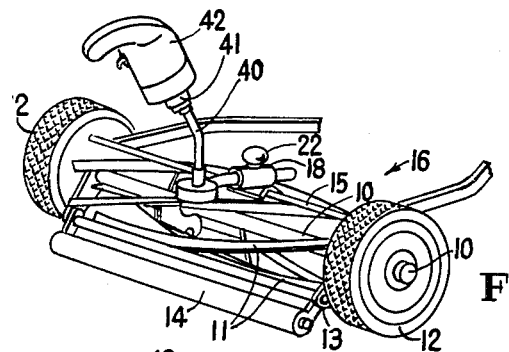
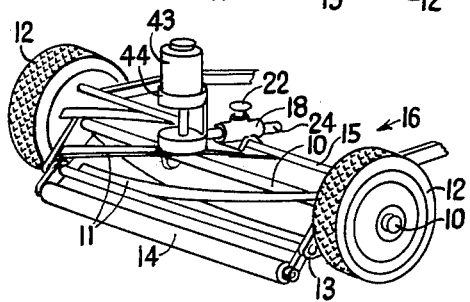
*INVENTORS*
Myrl M. Sauers.
Clinton B. McElheny.

United States Patent Office 3,019,568
Patented Feb. 6, 1962

3,019,568
LAWN MOWER GRINDER AND SHARPENER
Myrl M. Sauers and Clinton B. McElheny, both of
1630 Tartar Lane, Compton, Calif.
Filed May 19, 1960, Ser. No. 30,179
2 Claims. (Cl. 51—173)

This invention relates generally to portable grinding tools and specifically to improvements in devices for sharpening the blades of a lawn mower.

There have been several attempts in recent years to provide a suitable grinding tool for the sharpening of lawn mower blades without removing the spindle or otherwise dismantling the machine. The known grinding tools have not satisfied this need due partly to the design. The tools are cumbersome and complex in operation, and are impractical for many types of reel mower due to obstructions preventing the grinding of the extreme ends of the blades. A second disadvantage lies in the fact that the grinding wheels are disposed so as to grind only a small portion of the blade length at any one time. Such design results in an uneven cutting edge, which although sharp will not cut along the complete length.

It is therefore a primary object of this invention to provide a portable grinding tool of the above class which is capable of grinding the complete length of a reel blade and is similarly adapted for grinding the stationary blade.

It is a further object of this invention to provide a portable grinding tool of the above class which is adapted for grinding simultaneously spaced apart cutting surfaces along the length of a mower blade.

It is a still further object of this invention to provide a portable grinding tool for sharpening the blades of a lawn mower which is simple and efficient in operation, and which is adaptable for use on all types of lawn mower.

The invention consists of a combination of elements including a guide for sliding engagement with a lawn mower spacer rod. A post is adjustably secured to the guide in a transverse relationship and terminates at one end with a hole adapted to securely retain a shaft bearing. A motor located above the end of the post drives a shaft to which a cupped abrasive wheel, having a recessed central portion, is firmly secured. A wheel guard surrounds the circumference of the wheel and is secured to the post. Disposed centrally of the underside of the wheel is a blade guide plate having projections adapted to locate and slide along opposite sides of a lawn mower blade. The guide plate is secured to a bracket extending from the underside portion of the end of the spigot.

A full understanding of the details of the invention, together with further advantages, will become apparent by reference to the following detailed description of a preferred embodiment thereof, taken in conjunction with the attached drawings wherein:

FIG. 1 is a side elevation of the assembled tool shown partly in cross section.

FIG. 2 is an underside view of the tool shown in FIG. 1.

FIG. 3 is a perspective view of the preferred embodiment of the assembled tool.

FIG. 4 is a perspective view of a second embodiment incorporating modified tool and blade guides.

FIG. 5 is a perspective view of the device positioned for sharpening a reel blade and operated by an electric drill and flexible drive.

FIG. 6 is a similar perspective view as that of FIG. 5 only showing a fixed motor housing and encased motor which drives the abrasive wheel.

FIG. 7 is a fragmentary side view showing the relationship of the preferred guide members positioned for the grinding of a reel blade.

FIG. 8 is a fragmentary side view showing the second embodiment incorporating a modified blade guide.

Similar reference characters indicate corresponding parts throughout the several views in the drawing.

Referring now to the drawing in detail, the numeral 10 represents the central shaft of a blade reel having a series of spaced curved blades 11 secured thereto in a radial manner. The shaft terminates at each end in supporting wheels 12. A frame 13 supports a small grass roller 14, and a spacer rod 15 between opposite sides to complete the basic elements of a lawn mower 16.

A guide member 17 comprises a short strip of angle which is secured transversely beneath one end of a hollow tube 18. The other end of the tube has a slot 19 formed in one side and is provided with drilled bosses 20 on each side of the slot which are adapted to receive a clamping screw 21 having a knurled knob 22 at one end and a threadably engaging nut 23 at the other end.

A post 24 slidably engages within the tube 18 and may be adjustably secured thereto by the clamping screw 21. One end of the post is flattened as at 25 and is provided with a threaded hole adapted to receive a bushing 26 which is adjustably secured therein by a locking nut 27. A rotating shaft 28 having a machined thrust bearing flange 29 extends upwardly through the bushing 26. A nut 30 and washer 31 engage the lower end of the shaft and secure a cupped abrasive wheel 32 against the underside of the thrust bearing flange 29.

A wheel guard 33 is provided around the perimeter of the wheel and end tabs 34 secure the guard to the upper surface of the flattened post portion 25 together with a central horizontally extending plate 35 which is sealed to a forward portion of the post portion 25.

A blade guide member 36 is supported by a Z-shaped bracket 37 which is removably secured by bolts 38 to the underside of the flattened post portion 25. The blade guide 36 is preferrably in the form of a flat disc which is positioned within the depression 62 formed in the abrasive wheel 32. Upstanding from the underside of the guide 36 are two spaced apart bosses 39 which are adapted to slidably engage along opposite sides of a reel blade such as 11.

The power source for the abrasive wheel may consist of a flexible shaft 40 suitably secured at one end to the chuck 41 of an electric drill 42, or may be in the form of a more permanent assembly such as shown in FIGS. 1 and 6. An enclosed electric motor 43 is supported within a circular end frame 44 which is attached by means of nuts 45 to a bracket support 46. Coupling with the shaft 28 is effected by a bifurcated sleeve 47 which engages with a suitable pin 48 projecting radially from the shaft.

A modification of the tool guide and blade guide means is disclosed in FIG. 4. The tool consists of a rectangular plate 49 which is adjustably attached to a tool guide plate 50 by a knob 51 and threaded bolt 52. Projecting from one end of the plate 50 are two parallel mounting plates 53 spaced apart by a pin 54. The two strips 55 extend along the outer sides of the mounting plates and support between their ends freely running rollers 56 which are adapted to engage and roll along the mower spacer rod 15. An abrasive wheel 57 and guard 58 are similarly mounted to those previously described, and a Z-shaped bracket 59 supports a blade guide plate 60 centrally of the abrasive wheel. The guide plate 60 is provided with two spaced apart arcuate projections 61 which provide a guide channel for a reel blade.

In operation, after adjusting the spigot 24 relative to the tool guide 17, such that the abrasive wheel engages the reel blade surface at the correct angle, the guide is positioned in a sliding engagement over the spacer rod 15 and the reel is positioned for unrestricted rotation.

The blade guide 36 is engaged over a reel blade 11 and the tool is moved lightly over the complete length thereof until the desired cutting edge is obtained. It will be appreciated that the stationary mower blade may also be ground using this tool and utilizing the blade guide bosses 39 to control the movement of the wheel along the blade length.

Having described the invention with considerable particularity, it should be understood that various modifications may be made to the detail thereof, without departing from the scope or spirit of the invention as defined in the appended claims.

We claim:

1. A portable grinding tool for grinding lawn mower reel blades, comprising, a guide secured to extend transversely beneath one end of a sleeve, said sleeve being adapted to slidably receive a post, clamping means for securing the post with respect to the sleeve, said post flattened at one end and having a hole formed in the flattened end to receive a bushing adjustably secured thereto by a locking nut, a rotating shaft having a thrust bearing flange formed thereon and received through the bushing, a cupped abrasive wheel secured to one end of the shaft and a power source removably attached to the other end of the shaft, a wheel guard around the wheel, a blade guide disposed in a depression formed centrally in the cupped abrasive wheel, said blade guide supported by a bracket to the flattened end of the post and having spaced projecting lugs adapted to slidably engage along opposite sides of a mower reel blade, said cupped abrasive wheel adapted to selectively engage with the blade at spaced locations disposed in line with each other and extending across the full diameter of the grinding wheel.

2. A portable grinding tool according to claim 1 wherein said guide comprises an angle strip secured at the apex to the underside of the sleeve in a transverse relationship and adapted to slideably locate along a spacer rod of the mower.

References Cited in the file of this patent
UNITED STATES PATENTS

| | | |
|---|---|---|
| 979,880 | Olds | Dec. 27, 1910 |
| 2,193,854 | Benedict | Mar. 19, 1940 |
| 2,554,763 | Eickman | May 29, 1951 |
| 2,586,236 | Lewis et al. | Feb. 19, 1952 |
| 2,613,483 | Lewis et al. | Oct. 14, 1952 |
| 2,707,854 | Johnson | May 10, 1955 |

FOREIGN PATENTS

| | | |
|---|---|---|
| 1,009,765 | France | Mar. 12, 1952 |